United States Patent
Jansen et al.

(10) Patent No.: US 6,677,066 B1
(45) Date of Patent: Jan. 13, 2004

(54) CIRCUIT SYSTEM FOR AN INTEGRATED FUEL CELL SYSTEM

(75) Inventors: Axel Jansen, Ulm (DE); Jens Mueller, Blaustein (DE); Steffen Paul, Munich (DE); Jesef Sonntag, Senden (DE)

(73) Assignee: Ballard Power Systems AG, Kirchheim/Teck-Nabern (DE)

( * ) Notice: Subject to any disclaimer, the term of this patent is extended or adjusted under 35 U.S.C. 154(b) by 0 days.

(21) Appl. No.: 09/720,434

(22) PCT Filed: May 8, 1999

(86) PCT No.: PCT/EP99/03168

§ 371 (c)(1),
(2), (4) Date: May 2, 2001

(87) PCT Pub. No.: WO99/67869

PCT Pub. Date: Dec. 29, 1999

(30) Foreign Application Priority Data

Jun. 23, 1998 (DE) .......................... 198 27 880

(51) Int. Cl.[7] .............................. H01M 8/24; H01M 8/04
(52) U.S. Cl. ................. 429/7; 429/13; 429/22
(58) Field of Search ............................ 429/1, 7, 13, 22; 320/122

(56) References Cited

U.S. PATENT DOCUMENTS 3,808,534 A * 4/1974 Summers et al. ........... 340/517
4,719,401 A * 1/1988 Altmejd ....................... 320/122
5,156,928 A   10/1992 Takabayashi ................. 429/23
5,300,369 A * 4/1994 Dietrich et al. ................ 429/7
5,683,827 A * 11/1997 Yu ................................ 429/1

FOREIGN PATENT DOCUMENTS

| | | |
|---|---|---|
| DE | 195 26 836 A1 | 7/1995 |
| EP | 0 226 360 A2 | 11/1986 |
| JP | 08050902 | 2/1996 |

* cited by examiner

*Primary Examiner*—Carol Chaney
(74) *Attorney, Agent, or Firm*—Seed IP Law Group PLLC

(57) ABSTRACT

The present invention relates to a circuit arrangement for a composite fuel cell system comprising a plurality of individual fuel cells connected in series, the voltage of the individual fuel cells being monitored, in which case components are present which enable the individual fuel cells to be bridged in the sense of a low-resistance parallel circuit. Furthermore, the invention relates to a method for operating a circuit arrangement of this type, in which case the fuel cells are bridged if the magnitude of their voltage falls below a specific threshold value or if the sign of their voltage has changed relative to normal operation, or alternatively in which case the components are controllable switches which are driven if the composite fuel cell system is intended to be discharged.

25 Claims, 10 Drawing Sheets

CIRCUIT SYSTEM FOR AN INTEGRATED FUEL CELL SYSTEM

BACKGROUND AND SUMMARY OF THE INVENTION

This application claims the priority of German patent document 198 27 880.2, filed Jun. 23, 1998, and PCT International Application No. PCT/EP99/03168, filed May 08, 1999, the disclosures of which are expressly incorporated by reference herein.

The present invention relates to a circuit configuration for a fuel cell system comprising a plurality of individual fuel cells.

In $H_2/O_2$ composite fuel cell systems, operating states can arise in which individual cells change their polarity. The magnitude of the cell voltage is about 0.5 V in this case. In this operating state, the cell acts as a load and, at the same time, is heated to an impermissibly high level or is even destroyed. By way of example, electrical energy can be generated in a mobile energy generating system by means of a composite fuel cell system and can in turn be used for driving electric machines.

A composite fuel cell system comprises a plurality of individual fuel cells connected in series. Each individual fuel cell supplies the rated current $I_N$ of the composite fuel cell system and the sum of the voltages of the individual fuel cells produces the rated voltage $U_N$ of the composite fuel cell system. The generation of electrical energy takes place in the individual fuel cells by means of an electrochemical reaction of, for example, hydrogen, hydrogen-containing gas, methanol or the like. During operation, the hydrogen and/or oxygen supply may fail within individual fuel cells. As a result, depending on the substance that is missing, the voltage potentials of the anode or of the cathode are shifted, and the voltage of this individual fuel cell drifts from the positive to the negative range. This means that this fuel cell undergoes a polarity reversal; and because it this fuel cell is connected in series with the remaining fuel cells which have not undergone polarity reversal, the load current generated by the latter is impressed onto the fuel cell which has undergone polarity reversal. The fuel cell which has undergone polarity reversal therefore becomes the load and is heated on account of the power which it dissipates, so that it may be destroyed. Depending on the evolution of heat, under certain circumstances the entire composite fuel cell system may also be destroyed.

In order to avoid this result, a known procedure is to detect the voltages of the individual fuel cells. If it is determined that the voltage of an individual fuel cells is dropping excessively or is already undergoing polarity reversal, the gas feed to the entire composite fuel cell system is stopped in order to avoid destruction of the composite fuel cell system.

Against this background, one object of the present invention is to provide a circuit arrangement, and a method operating it, which can avoid destruction of or damage to the composite fuel cell system or individual cells in the event of a fault in individual fuel cells.

This and other objects and advantages are achieved by the method and apparatus according to the invention, in which the voltages of individual fuel cells are monitored, and circuit components are provided in the form of a low-resistance parallel circuit, (for example, diodes) for bridging individual fuel cells. Such bridging is implemented if the magnitude of their voltage falls below a specific threshold value or if the sign of a cells voltage has changed relative to normal operation. Alternatively, controllable switches are provided, which are driven if the composite fuel cell system is intended to be discharged.

Owing to the fact that individual defective fuel cells can be bridged, the composite fuel cell system can remain in operation, supplying the electrical energy that is generated by the remaining fuel cells.

Automatic regulation can be effected by selecting the diodes in such a way that the forward voltage of the diodes has a value at which the individual fuel cell should expediently be bridged owing to polarity reversal. During normal operation of the individual fuel cells, the diodes are reverse-biased.

The use of controllable switches, as mentioned above, allows the bridging of individual fuel cells to be performed more flexibly. By way of example, these controllable switches may already be driven when the voltage of the individual fuel cells has not yet undergone polarity reversal but has fallen below a specific threshold value, which may be 0.5 V for example. Moreover, when using controllable switches, it is possible to discharge the composite fuel cell system during maintenance work by driving the controllable switches, thereby avoiding danger to persons during the maintenance work that is to be carried out.

In one embodiment of the circuit arrangement according to the invention, the controllable switches are MOS field-effect transistors, which can be driven with minimal power losses, even when the switched powers are comparatively large.

In another embodiment of the circuit arrangement according to the invention, the components are fitted externally to the composite fuel cell system, which is advantageous if the contact-connection of the components has a large area, in order to minimize the current density (and thus the local evolution of heat). Furthermore, it is advantageous if the heat can be dissipated in a simple manner. The contact-connection of the components can be effected between the graphite plates.

In still another embodiment of the invention, the components are integrated in the composite fuel cell system. This simplifies the production process because the components do not have to be present as separate structural parts. Furthermore, it is possible in this case to limit the current density by correspondingly suitable dimensioning of the structural parts. In an advantageous refinement, in accordance with this embodiment, the components are integrated in the edge of the composite fuel cell system, simplifying the contact-connection of the components, because the latter touch the graphite plates directly. Moreover, good heat dissipation is ensured on account of the components being introduced into the edge.

In yet another embodiment of the invention, the components are distributed over the cross-sectional area of the composite fuel cell system. As a result, the components no longer form additionally structural parts, thereby simplifying the production sequence.

In a further embodiment, a cooling system is integrated in the composite fuel cell system, so that a heat loss which arises in the components (and cannot be output directly to the surroundings) is advantageously dissipated.

In another embodiment a controllable switch is driven via the output of an amplifier or comparator, which output is connected to the control terminal of the controllable switch, which has an input connected to the terminals of the individual fuel cell. The amplifier or comparator is supplied with energy by connection with the terminals of a battery arrangement via current sources or current sinks. A potential shifting element furthermore is connected in parallel with the terminals for supplying energy, with a voltage dividing element connected in parallel with this potential shifting element. The tap of this voltage dividing element is connected to the other terminal of the individual fuel cell.

The potential shifting element may be a zener diode, for example. The voltage dividing element may be a potentiometer or a subdivided zener diode.

This advantageously makes it possible to supply power from a battery arrangement—for example also from the composite fuel cell system itself—using an internal reference voltage of the amplifier or comparator. This circuit arrangement avoids the problems which arise as a result of a potential shift depending on which of the individual fuel cells is to be examined. Furthermore, the current sources take up possible operating voltage fluctuations in the battery arrangement.

The controllable switch may be a MOS enhancement-mode or depletion-mode transistor of the n- or p-channel type, or a Darlington bipolar transistor of the npn or pnp type. The amplifier or comparator (inverting/non-inverting) and the expedient assignment of the operating voltage reference point are determined by the choice of the corresponding controllable switch.

In another embodiment, particularly in the case of the fuel cells which are arranged at the periphery of the composite fuel cell system, a potential shifting circuit is arranged between one terminal of each individual fuel cell and the input of the amplifier or comparator, and also between the tap of the voltage dividing element and the other terminal of the individual fuel cell. In this manner, it is advantageously possible to achieve a sufficient voltage level also for monitoring the individual fuel cells situated at the edge of the fuel cell system.

In a further advantageous embodiment of the invention, a potential shifting circuit is provided between the output of the comparator or amplifier and the control terminal of the controllable switch. Moreover, it is also advantageous in accordance with claim 13 to design the circuit arrangement in such a way that the voltages of the individual fuel cells are evaluated by means of an amplifier or comparator whose output is connected to at least one optocoupler, the controllable component being controlled via the optocoupler.

Particularly when monitoring individual fuel cells which are arranged at the extremities of the composite fuel cell system, it is possible to achieve a sufficient voltage for driving the controllable component.

The circuit arrangement according to the invention, may advantageously be designed as an integrated circuit.

In a method for operating the circuit arrangement according to the invention, the fuel cells are bridged if the magnitude of their voltage falls below a specific threshold value or if the sign of their voltage has changed relative to normal operation. This can be effected by suitable setting or dimensioning of the circuit arrangement.

The controllable switches are driven if the composite fuel cell system is intended to be discharged. As a result, it is possible to ensure the safety of persons, for example during maintenance work on the composite fuel cell system, if the composite fuel cell system is discharged before the maintenance work is carried out.

Other objects, advantages and novel features of the present invention will become apparent from the following detailed description of the invention when considered in conjunction with the accompanying drawings.

DETAILED DESCRIPTION OF THE DRAWINGS

Figure 1:
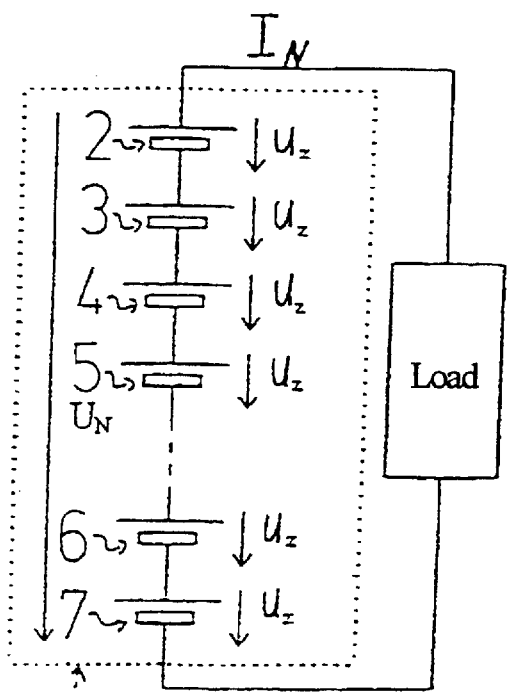
FIG. 1 shows a composite fuel cell system comprising a plurality of individual fuel cells.

FIG. 1 shows a composite fuel cell system 1 comprising a plurality of individual fuel cells, which are numbered by the numerals 2 to 7. Each of the individual fuel cells 2, 3, 4, 5, 6 and 7 supplies the rated current $I_N$ of the composite fuel cell system 1. Owing to the individual fuel cells 2 to 7 being connected in series, the sum of the cell voltages of the individual fuel cells 2 to 7 produces the rated voltage $U_N$ of the composite fuel cell system. The generation of electrical energy takes place in the individual fuel cells 2, 3, 4, 5, 6 and 7 by means of an electrochemical reaction of e.g. hydrogen, hydrogen-containing gas, methanol, etc.

Figure 2:
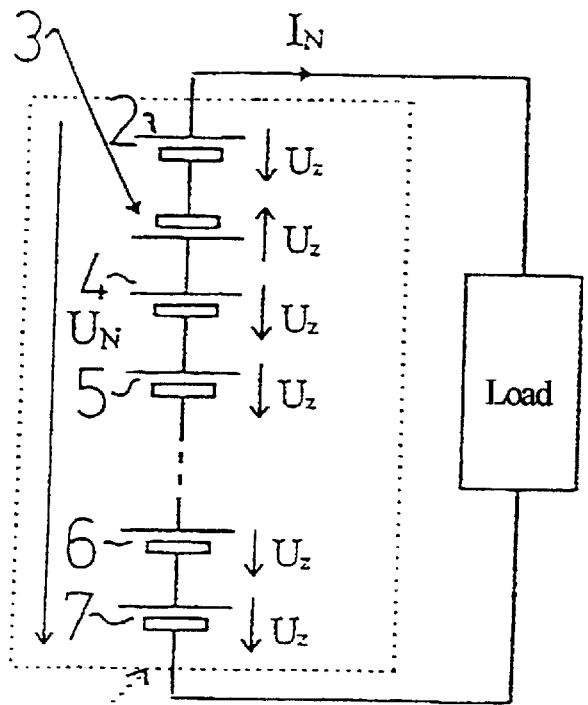
FIG. 2 shows a composite fuel cell system comprising a plurality of fuel cells, one of which has a defect.

FIG. 2 again shows a composite fuel cell system 1 in which, however, one fuel cell 3 is defective. During operation of the composite fuel cell system 1, the hydrogen and/or air supply may fail in a number of cases within individual cells 2, 3, 4, 5, 6, 7. As a result of this, depending on the substance that is missing, the voltage potentials of the anode or of the cathode are shifted. As depicted in the Figure, the voltage of the individual fuel cell 3 drifts from the positive to the negative range, and undergoes polarity reversal. Since this individual fuel cell 3 which has now undergone polarity reversal is connected in series with the remaining individual fuel cells 2, 4, 5, 6, 7 which have not undergone polarity reversal, the load current generated by the latter is impressed into the fuel cell 3 which has undergone polarity reversal. The latter thereby becomes the load and is heated on account of the power dissipated in it. This leads to the destruction of the fuel cell 3 which has undergone polarity reversal, and, depending on the evolution of heat, can also destroy the entire composite fuel cell system 1.

Figure 3:
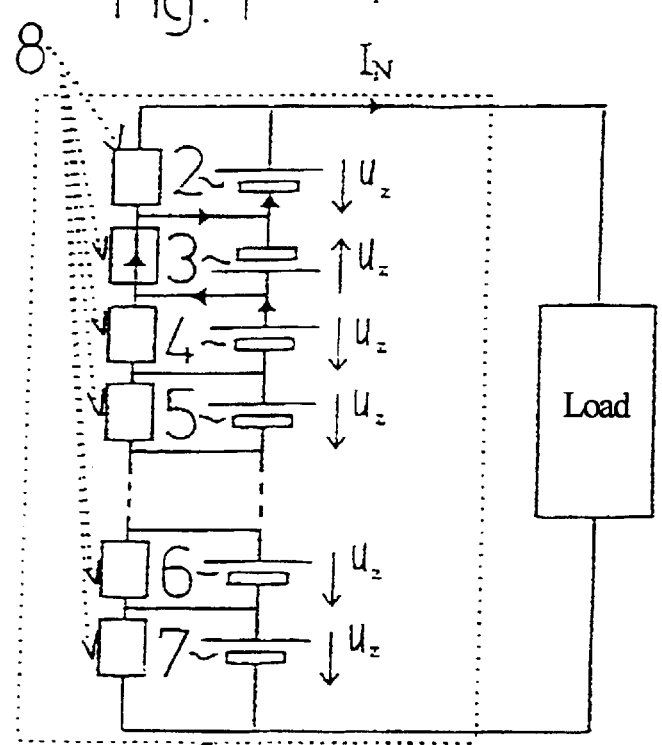
FIG. 3 shows a circuit arrangement in which an element is connected in parallel with each individual fuel cell and enables the respective fuel cell to be bridged in a low-resistance manner.

In order to avoid this problem, as is shown in FIG. 3, in the circuit according to the invention, the individual fuel cells 2, 3, 4, 5, 6, 7 are bridged by means of respective components 8 in the form of a low-resistance parallel circuit.

When, the defective fuel cell 3 is bridged by the associated component 8 in this manner there is no longer a power loss in the fuel cell 3 which has undergone polarity reversal.

Figure 4:
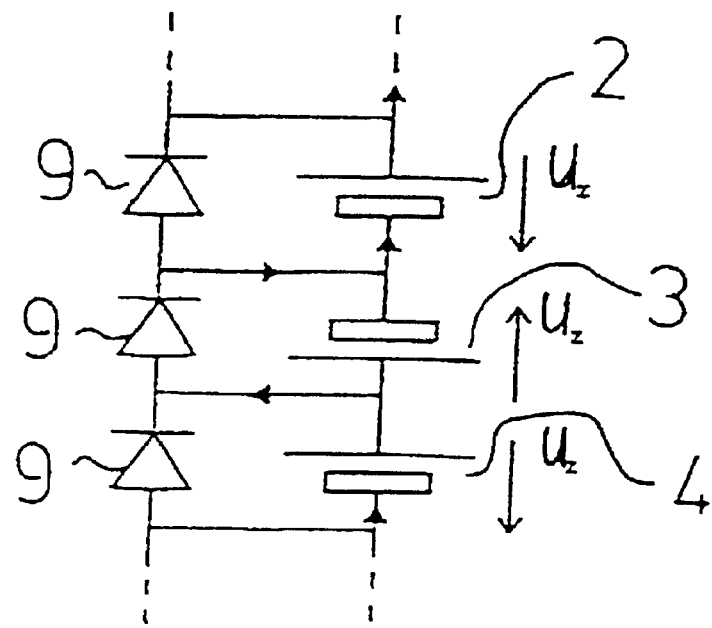
FIGS. 4 and 5 show options for embodying the components.

As shown in FIG. 4, these components 8 may be diodes 9 which are connected in parallel with the individual fuel cells 2, 3, 4, 5, 6, 7 in a manner antiparallel with respect to the load current direction. These diodes 9 are each turned on when the voltage of the associated individual fuel cell 2, 3, 4, 5, 6, 7 has undergone a polarity reversal. This circuit arrangement is self-controlling. In other words, the diode, in accordance with its characteristic curve, accepts the load current as a function of the cell voltage. For voltages above the diode threshold voltage, the diode can be regarded as switched on. By choosing a suitable diode, the forward voltage may lie between 0.2 V for Schottky diodes and 0.7 V for silicon diodes.

Figure 5:
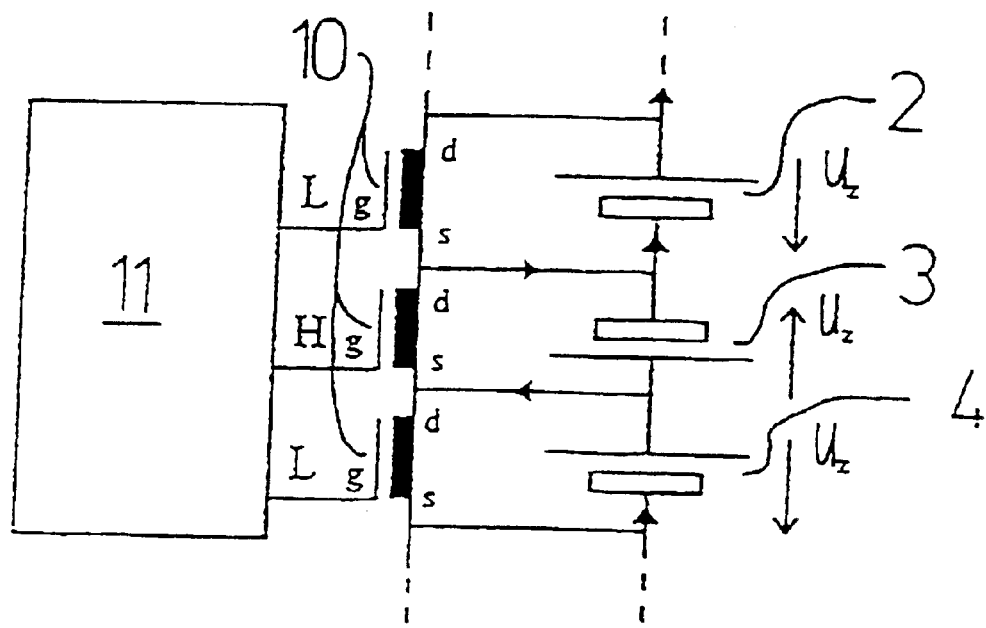

A further exemplary embodiment is shown in FIG. 5, according to which MOS-FETs 10 are connected in parallel with each individual fuel cell 2, 3, 4, 5, 6, 7, the drain-source paths of which MOS-FETs accept the load current if the drive electronic unit 11 detects an excessively low or negative voltage of an individual fuel cell 2, 3, 4, 5, 6, 7. FIG. 5 reveals the signal levels which are output by the drive electronic unit 11 to the gates of the individual MOS-FETs 10. In the case of the transistor type used in the exemplary embodiment of FIG. 5, the HIGH level is applied to the gate of the MOS-FET 10 which is assigned to the defective fuel cell 3, with the result that the load current is accepted by the drain-source path of the said MOS-FET 10. In the case of the transistor type used in the exemplary embodiment of FIG. 5, the LOW level is applied to the gates of the other MOS-FETs 10 which are assigned to the fuel cells 2, 4, 5, 6, 7, with the result that these MOS-FETs are in the off state.

The circuit arrangement according to FIG. 5 likewise enables the individual fuel cells 2, 3, 4, 5, 6, 7 to be discharged in a defined, reliable and non-destructive manner. As a result of this, with the composite fuel cell system 1 switched off, the total voltage of the composite fuel cell system 1 can be kept so low that, by way of example, no persons are endangered when carrying out maintenance work.

It is thus possible to realize a protective device with a controllable power element as a shunt path in parallel with the individual fuel cell. This controllable power element is influenced by a control device which in turn has specific switch-on conditions. In addition to the protective function just described, a further switch-on condition can be derived from a voltage signal of the individual fuel cell. This voltage of the individual fuel cell is about 1 V during normal operation of the cell with a continuous change to a negative value of the order of magnitude of −0.5 V in the event of polarity reversal of the individual fuel cell.

The components are intended either to be fitted externally to the composite fuel cell system or to be integrated in the composite fuel cell system. To that end, it is necessary to make structural changes to the graphite plates in comparison with previously known composite fuel cell systems. To integrate the components in the composite fuel cell system, it is necessary to provide corresponding openings whose positions have to be chosen in such a way that, on the one hand, a uniform distribution of the current density over the cell area and also a corresponding dissipation of the resulting power loss heat are ensured.

Figure 6:
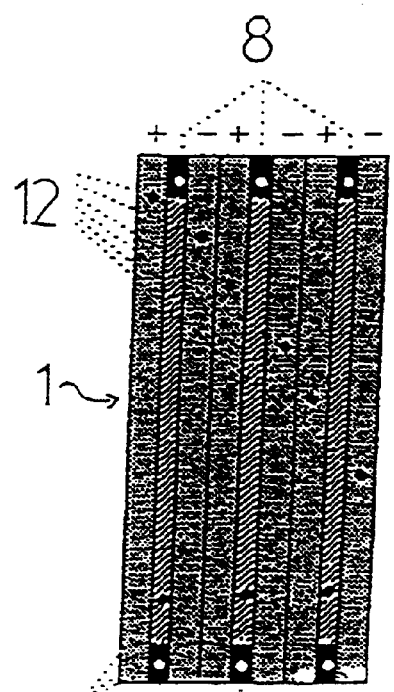
FIGS. 6 to 10 show options for fitting the components to the composite fuel cell system.
Figure 7:
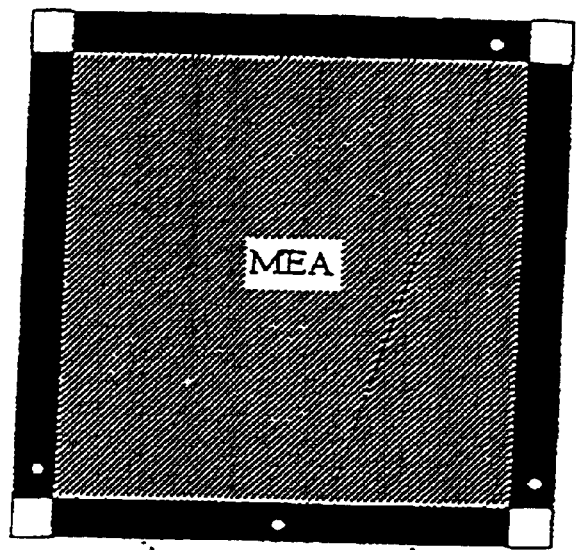

FIGS. 6 and 7 show possible solutions for integrating the components in the composite fuel cell system. FIG. 6 shows a composite fuel cell system 1 in side view, the graphite plates 12 being laterally enlarged such that there is sufficient space for the components 8. The entire load current can flow through the additional cross section without any loss of power. FIG. 7 shows a section through the composite fuel cell system in accordance with the illustration in FIG. 6. The MEA can be seen, which is provided with the reference numeral 13 in the illustration in FIG. 6, the components 8 being arranged on the outer edge of the said MEA. This ensures that the heat loss can be dissipated to the surroundings. In the case of the configuration according to FIGS. 6 and 7, it is found that simple contact-connection of the components 8 with the graphite plates 12 becomes possible because the latter lie directly on top of one another.

Figure 8:
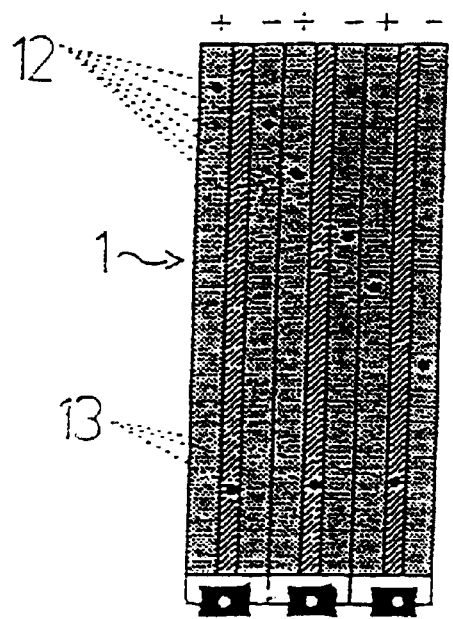

FIG. 8 shows a further possibility for fitting the components 8. In this case, the components 8 are arranged externally on the composite fuel cell system 1. The electrical terminals of the components 8 are in this case inserted between the graphite plates 12.

Figure 9:
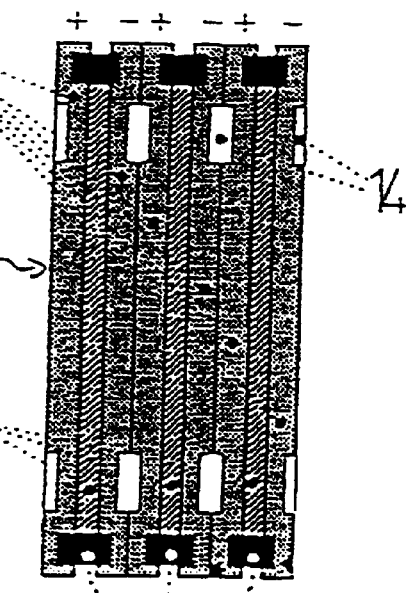

A further possibility is shown in FIG. 9, in which the components 8 are offset inwards in comparison with the arrangement according to FIGS. 6 and 7. In this configuration, in particular, it has proved advantageous to provide additional cooling channels 14 in order to achieve an improved heat dissipation.

Figure 10:
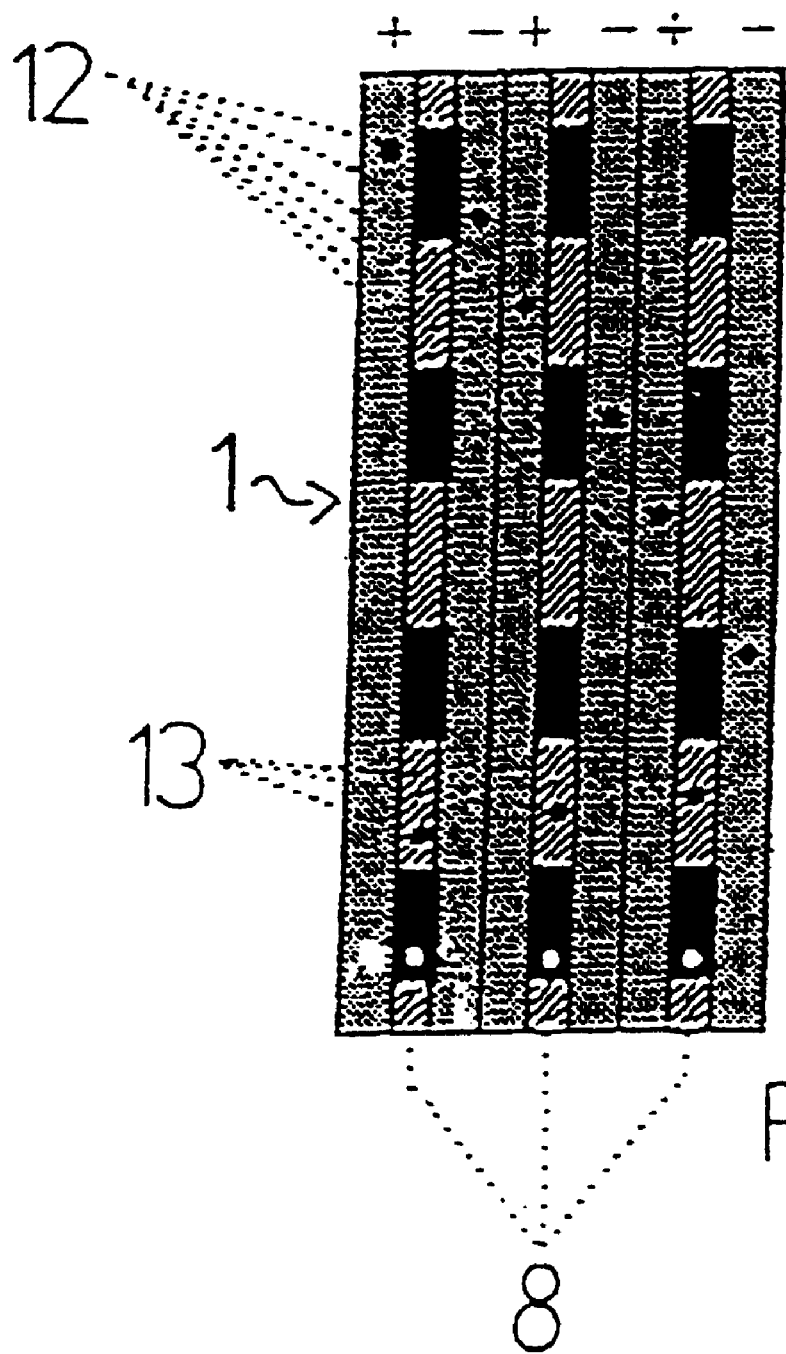

FIG. 10 shows a further possibility for integrating the components 8 in the composite fuel cell system 1. In this case, the MEA 13 is constructed in such a way that it forms a unit together with the components 8. In this case, not only are the advantages manifested in the case of the electrical contact-connection as has also already been achieved with the arrangements according to FIGS. 6, 7 and 9; in addition, in the configuration according to FIG. 10, the production sequence can also be simplified because the components 8 no longer have to be designed as separate structural parts.

A further problem is that a dedicated reference potential has to be chosen for the protective circuit arrangement of each individual fuel cell, which e.g. necessitates in each case a separate current supply for the control unit. On the other hand, however, it is expedient to draw the current supply of all the control units from the fuel cell itself, where the intention is to compensate possible operating voltage fluctuations.

This problem can be solved by the voltage of the individual fuel cells being fed to an amplifier or comparator which controls a controllable switch. Instead of one controllable switch, it is also possible to control a plurality of controllable switches connected in parallel. This again reduces the non-reactive resistance.

A special circuit design ensures that the switch-on instant of the controllable switch is adjustable as desired within the voltage range of the voltage of the individual fuel cell.

The variation of the switch-on instant is achieved by means of an additional (variable) auxiliary voltage in series with the measurement signal of the individual fuel cell. The auxiliary voltage is produced by splitting the floating ground point of the amplifier/comparator circuit and the ground point of the voltage supply of the amplifier. The amplifier operating voltage is obtained as a voltage across two zener diodes (with potentiometer connected in parallel) which are connected via current sources/current sinks to the external terminals of the composite fuel cell system or of an auxiliary battery. The current sources take up the residual voltage drops and thus operating voltage fluctuations as well.

Figure 11:
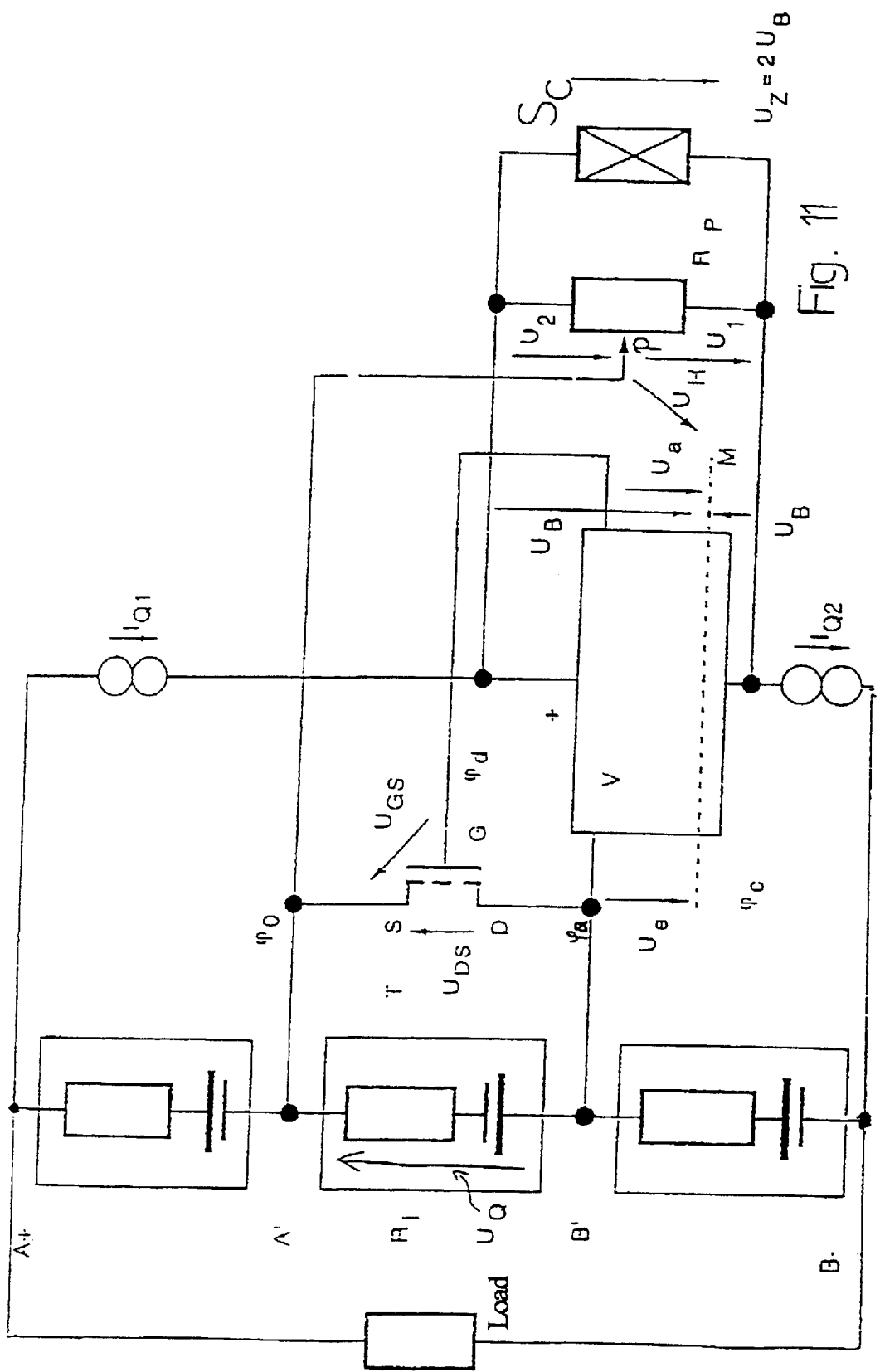
FIG. 11 shows an exemplary embodiment of a circuit arrangement according to the invention.

FIG. 11 shows a first exemplary embodiment of a circuit arrangement of this type. The amplifier/comparator V is fed by the two current sources $I_{Q1}$, $I_{Q2}$ (the same order of magnitude) in a floating manner in potential terms and its supply voltage is set to $U_z=2U_B$ by a potential shifting element Sc (for example two zener diodes), which effects voltage stabilization. The tap P represents the reference potential $\Phi_0$ of the circuit. This tap P is at the same time connected to one of the two poles of the individual fuel cell to be protected. The power protective element T, expediently a field-effect or Darlington bipolar transistor, is connected in parallel with this individual fuel cell.

The amplifier has the floating ground M at exactly half the operating voltage. The auxiliary voltage ($U_2=k'2U_B$) is produced between potentiometer tap P and floating ground M:

$$U_H=U_B-U_2,==>-U_B<==U_H<==U_B,$$

so that M has the potential $\Phi_c=\Phi_0-U_H$.

The amplifier/comparator V (with the input voltage $U_e$) is connected, on the input side, to the individual fuel cell (terminal B') and the following holds true:

$$U_e=\Phi_a-\Phi_c=\Phi_a-\Phi_0+U_H=U_Q+U_H.$$

$U_Q$ is the cell voltage of the battery in the inversion state >0. If the amplifier/comparator has the transfer characteristic $U_a=kU_e$ for the output voltage $U_a$ (k>0: non-inverting; k<0: inverting; in accordance with the illustration in FIGS. 12 and 13), then the output potential is:

$$\Phi_d=U_a+\Phi_c=kU_e+\Phi_0-U_H.$$

In the comparator or saturation operating mode, $kU_e$ maximally reaches the values $+U_B$ or $-U_B$, respectively. As a result, the voltage $$\Phi_d-\Phi_0=U_{GS}=+U_B \text{ (or } U_B)--U_H$$

is available as control signal for the power switch, which voltage may lie maximally between $-2U_B<=U_{GS}<=2U_B$, depending on the design. Since the comparator circuit (or amplifier arrangement) changes over at $U_e=0$ (that is to say at $\Phi_0-\Phi_a=U_H$) and ($\Phi_a-\Phi_0$) is given by the respective state of the individual fuel cells (the terms signify the following: ($\Phi_a-\Phi_0$)<0: normal operation; ($\Phi_a-\Phi_0$)>0: inversion operation, endangerment of the cell), the changeover point can be set as desired by the choice of $U_H=U_B-U_2$ (greater than, equal to, or less than 0) and thus by the voltage dividing element (potentiometer $R_p$).

The controllable switch T used may expediently be a MOS power FET which is connected in parallel with the individual fuel cell by its source-drain path in such a way that it operates in the resistance or saturation operating mode in the case of blocking of the cell (cell blocking circuit). In principle, corresponding operation on the forward-biased individual cell is also possible, but the cell blocking circuit should be preferred.

Figure 12:
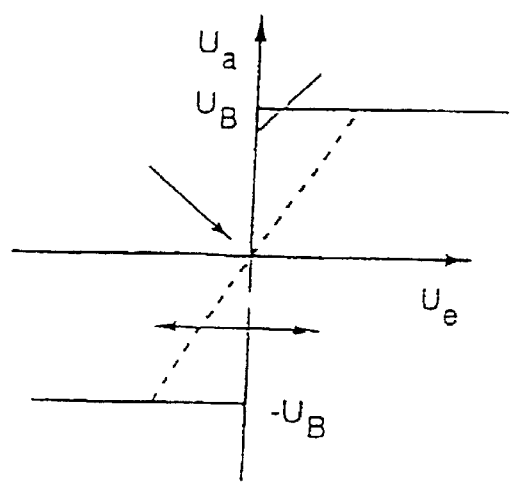
FIGS. 12–14 show signal profiles of the circuit arrangement according to FIG. 11.

In the absence of the control signal $U_{GS}$ (i.e. strictly speaking for $U_{GS}<U_{TH}$, $U_{TH}$ threshold voltage of the n-channel enhancement-mode transistor), the n-channel transistor, according to FIG. 12, is:
switched off in the case of the enhancement-mode FET and
switched on in the case of the depletion-mode FET.

Figure 13:
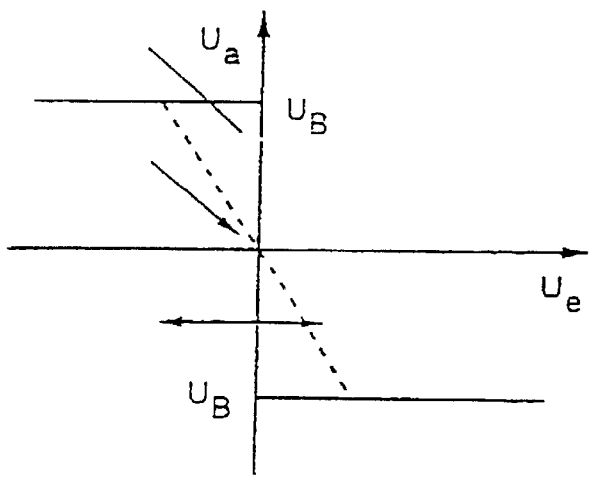

In an analogous manner, as shown in FIG. 13, the protective circuit can also be designed for a complementary power switch.

Figure 14:
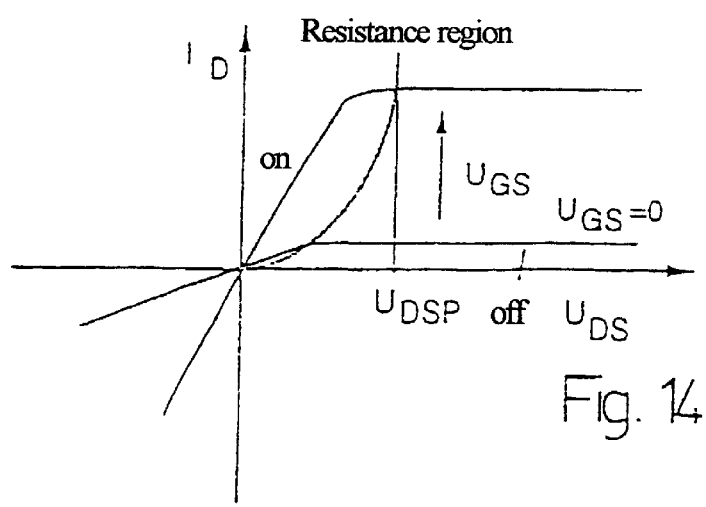

In the switched-off state, there flows through the source-drain path of the field-effect transistor as shown in FIG. 11 only a negligible residual current, which is apparent from the illustration in FIG. 14. In the switched-on state, the resistance (in the resistance region operating mode) amounts to approximately:

$$R=k/(U_{GS}-U_{TH}).$$

In this case, the voltage UDS lies below the saturation voltage $U_{DSP}$, which lies approximately between 0.1 and 2 V in the case of power transistors. There is no threshold voltage $U_F$ in the $I_D$-$U_{DS}$ characteristic curve, as is the case, for instance, with a semiconductor diode, for which the threshold voltage $U_F$ is approximately 0.7 V. By means of the control voltage $U_{GS}$, the on resistance ∞ can be controlled in a continuously variable manner between (transistor switched off) and a minimum value (transistor-dictated).

The adjustable resistance R depends on the required maximum current through the cell in the blocking state; it can, if appropriate, be reduced by connecting a plurality of transistors in parallel and is determined by the transistor type used.

By way of example, if an n-channel enhancement-mode transistor is to be used as the controllable switch, which transistor changes over in the case of voltage inversion of the individual cell (that is to say for the condition $\Phi_a>\Phi_0$), then on account of $U_{GS}>0$, the gate potential $\Phi_d$ must rise relative to $\Phi_0$ in order to switch the transistor on. Since the output potential has the value $\Phi_d=U_B-U_H+\Phi_0$ (given a non-inverting amplifier/comparator) in this case, the transistor is switched on. On an inverting comparator, by contrast, $\Phi_d=-U_B-U_H+\Phi_0$ would occur and the transistor is switched off.

Strictly speaking, the switch-on condition due to the transistor threshold voltage $U_{TH}$ (>0, n-channel enhancement-mode transistor) read $U_{GS}-U_{TH}>0$, i.e. $U_{GS}>U_{TH}$. Conversely, a depletion-mode n-channel transistor would be switched off in the first case and switched on in the second case.

Without restricting the generality, the negative pole B' of the individual fuel cell can also be chosen as the reference potential $\Phi_0$. The control conditions of the controllable switch then have to be modified correspondingly.

When a field-effect transistor is used, the bulk terminal should be (negatively) biased in such a way that the substrate diode remains turned off both in the forward and in the reverse operating mode of the transistor.

If there is no bulk terminal present, then drain and source must be interchanged, that is to say exactly the opposite of the circuit arrangement shown in FIG. 11. As a result, the substrate diode is in the field that has not undergone polarity reversal(normal state) in the turned-off state.

A Darlington bipolar transistor can also be used as the controllable switch. In this case, the terminal points B'=collector, A'=emitter should be chosen for an npn transistor and the control voltage $U_{BE}$ analogously has the same sign as $U_{GS}$.

The Darlington transistor affords the major advantage over the customary bipolar power transistor of the distinctly lower control current (in the mA range). Owing to the high output current required in the range between 50A and 100A, control currents in the A range would otherwise be necessary, which cannot be applied by the protective circuit.

There are various realizations for the current sources/current sinks $I_{Q1}$, $I_{Q2}$; these realizations are not discussed further here. One or a plurality of series-connected zener diodes, for example, may be used as the potential shifting elements.

Furthermore, it must be ensured that a sufficient voltage drop occurs across the current sources. That may be problematic particularly when processing signals of the cells at the extremities of the composite fuel cell system. Whereas the current supply of the amplifier/comparator via current sources from the composite fuel cell system is always possible if the individual fuel cell to be protected is located in the central part of the composite fuel cell system, problems can arise in the case of an individual fuel cell situated in the extremities of the composite fuel cell system. It can then happen that a sufficient voltage drop is no longer available for one of the two current sources.

Figure 15:
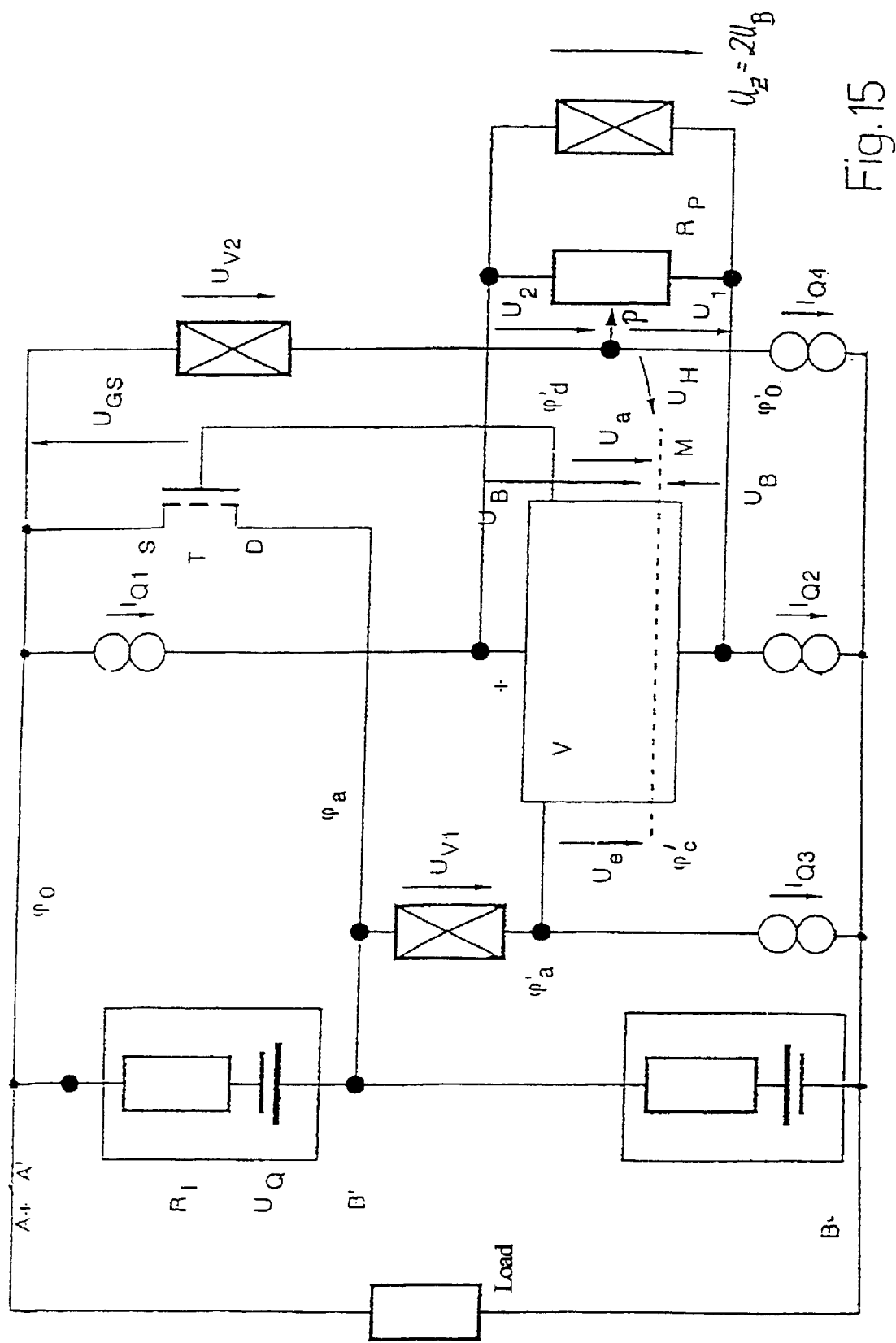
FIG. 15 shows a further exemplary embodiment of the circuit arrangement according to the invention.

The use of a circuit according to the exemplary embodiment as shown in FIG. 15 gives rise to the following control conditions. The potential $\Phi_a$ of the battery pole B', which supplies the measurement signal, is shifted by a potential shifting circuit ($U_{V1}$, $I_{Q3}$) by the voltage $U_{V1}$ to $$\Phi_a' = \Phi_a - U_{V1}.$$

The same applies to the output ground point P, whose potential is shifted by the potential shifting circuit $U_{V2}$, $I_{Q4}$ between the points A, B of the composite fuel cell system to $$\Phi_0' = \Phi_0 - U_{V2}.$$

The floating ground M then has the potential $\Phi_c' = \Phi_0' - U_H$, where $U_H = U_B - U_2$. The control signal $$U_e = \Phi_a' - \Phi_c' = \Phi_a - U_{V1} - \Phi_0 + U_{V2} + U_H = \Phi_a - \Phi_0 + U_H, \text{ where } U_{V1} = U_{V2}$$

is present at the amplifier input.

The auxiliary voltage can now additionally be modified by $U_{V1}$ or $U_{V2}$. The output potential is:

$$\Phi_d' U_a + \Phi_c' = k U_e + \Phi_c' = > + U_B + \Phi_c' \text{ or } - U_B + \Phi_c'.$$

The control voltage of the controllable switch T (n-channel enhancement-mode FET) is:

$$U_{GS} = \Phi_d' - \Phi_0 = U_a + \Phi_c' - \Phi_0 = + U_B \text{ (or } -U_B) + U_a - U_{V2} - U_H.$$

The voltage $U_{GS} - U_{TH}$ is again critical for the switch-on voltage. The shift voltage $U_V$ should be of the order of magnitude of the supply voltage $U_B$.

The circuit according to FIG. 15 can be designed for controllable switches such as, for example, n-/or p-channel depletion-mode/enhancement-mode MOSFET, npn Darlington transistor, the transistor types that are complementary thereto, for the last individual fuel cells located at the lower end (at B-), or else for the choice of B' instead of A' as common reference potential $\Phi_0$.

Figure 16:
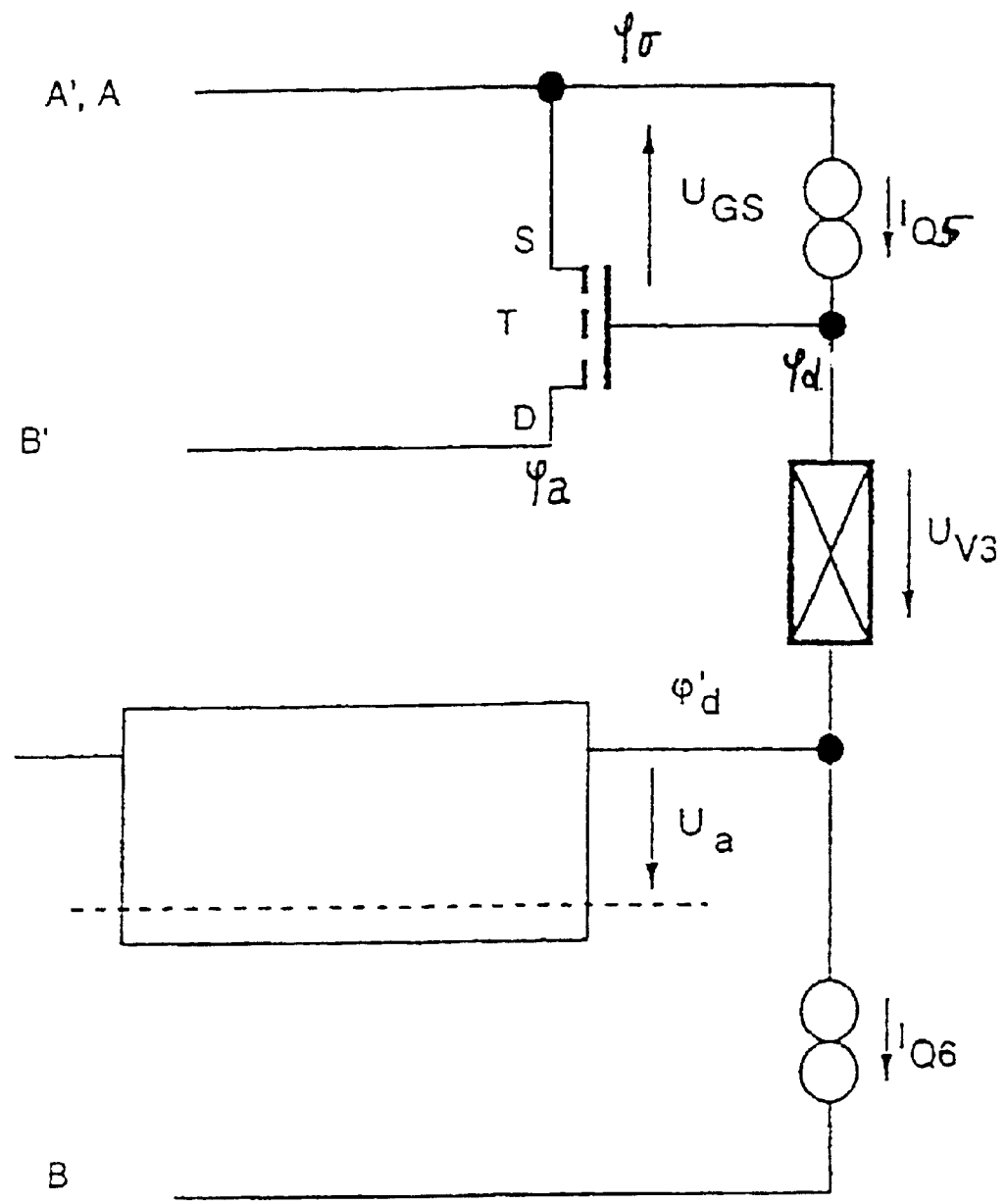
FIG. 16 shows a detail of the circuit arrangement according to the invention.

A further configuration of the output circuit is revealed in FIG. 16, according to which the amplifier output operates on a voltage shift-back circuit comprising the two current sources $I_{Q5}$, $I_{Q6}$ and the shifting element $U_{V3}$, the two current sources $I_{Q5}$ and $I_{Q6}$ being as far as possible identical. The control voltage is:

$$U_{GS} = \Phi_a - \Phi_0 = \Phi_d' + U_{V3} - \Phi_0 = + U_B \text{ (or } -U_B) + U_{V3} - U_{V2} - U_H$$

with the special case $U_{V3} = U_{V2}$.

In this case, the current source $I_{Q5}$ should have the lowest possible compliance voltage (below the threshold voltage of T), which can be realized sufficiently well, e.g., using a depletion-mode field-effect transistor.

Figure 17:
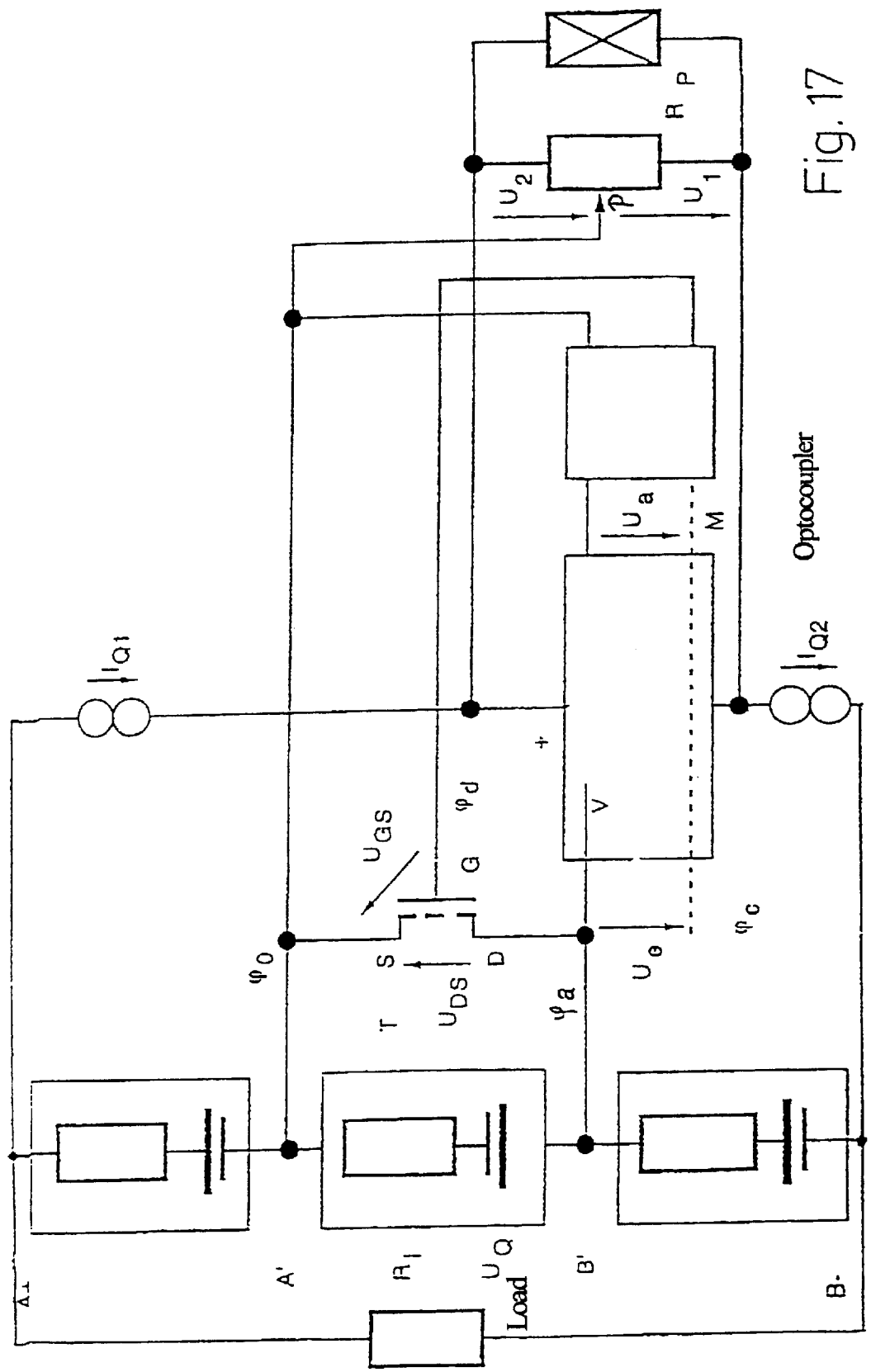
FIG. 17 shows a further exemplary embodiment of the circuit arrangement according to the invention.
Figure 18:
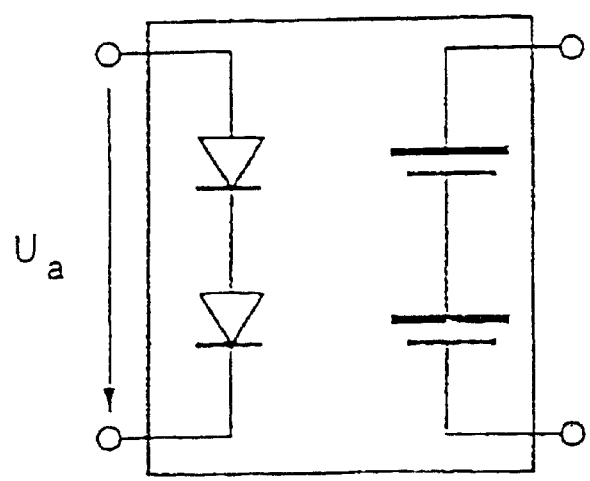
FIGS. 18 to 20 show details of the circuit arrangement according to FIG. 17.
Figure 19:
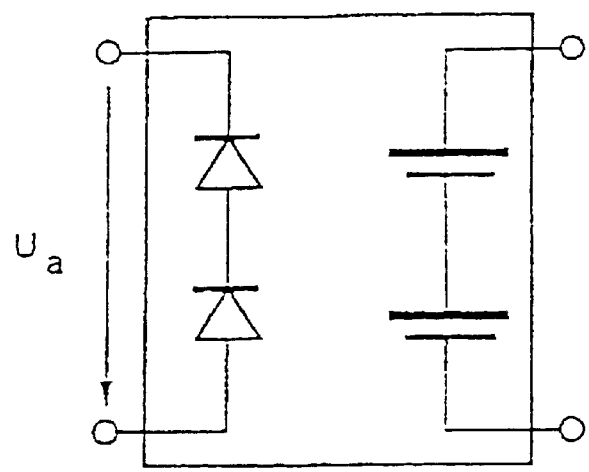
Figure 20:
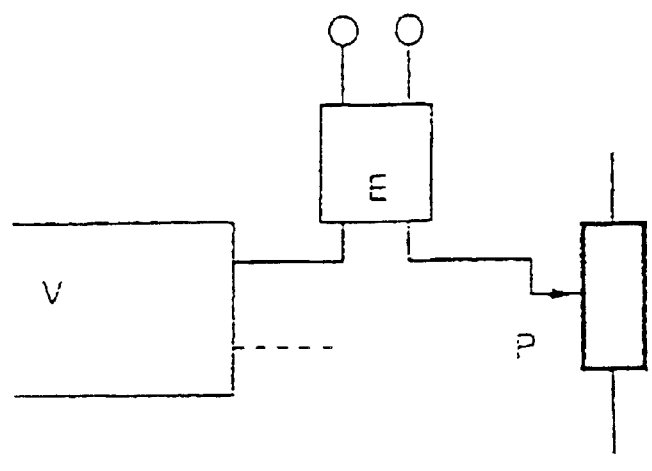

A further configuration of the circuit arrangement is apparent in FIG. 17, according to which the output of the amplifier switches on one or a plurality of series-connected optocouplers whose output no-load voltages are connected in series, in accordance with the illustrations in FIGS. 18 to 20. The number of optocouplers is determined by the required switch-on voltage of the controllable switch T. The output no-load voltage of a coupler is approximately 1 V.

The optocoupler can be connected between amplifier output and floating ground point M or point P; the optocoupler can likewise be forward-biased given a positive amplifier output voltage $U_A$. Reverse-biasing is likewise possible.

The output circuit with optocouplers according to FIG. 17 can also be applied to other exemplary embodiments of circuit arrangements (FIGS. 11 and 15). In this case, a voltage shift-back circuit $U_{V3}$, $U_{Q5}$, $U_{Q6}$ can be dispensed with.

On account of the relatively large output current of the optocoupler (a few mA), the circuit arrangement according to FIG. 17 is particularly suitable for Darlington power switches.

The circuit arrangement according to FIG. 17 can also be used for the controllable switches and other use conditions which have been explained in connection with FIGS. 11 and 15.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A protective circuit for a composite fuel cell system having a plurality of serially connected individual fuel cells whose voltage is monitored, said protective circuit comprising:
   a plurality of components connected in parallel with respective individual fuel cells of the fuel cell system;
   wherein said components are diodes adapted to bridge particular individual fuel cells via a low resistance connected in parallel therewith in response to a voltage across said particular individual fuel cells.

2. The circuit of claim 1 wherein the components are connected externally to the composite fuel cell system.

3. The circuit of claim 1 wherein the components are integrated in the composite fuel cell system.

4. The circuit of claim 3 wherein the components are integrated in edge areas of the composite fuel cell system.

5. The circuit of claim 3 wherein the components are integrated in the composite fuel cell system and distributed over a cross-sectional area of the composite fuel cell system.

6. The circuit of claim 5, further comprising a cooling system integrated with the composite fuel cell system.

7. A protective circuit for a composite fuel cell system having a plurality of serially connected individual fuel cells whose voltage is monitored, said protective circuit comprising:
   a plurality of components connected in parallel with respective individual fuel cells of the fuel cell system;
   wherein said components are MOS field-effect transistors adapted to bridge particular individual fuel cells via a low resistance connected in parallel therewith in response to a voltage across said particular individual fuel cells.

8. The circuit of claim 7 wherein the components are connected externally to the composite fuel cell system.

9. The circuit of claim 7 wherein the components are integrated in the composite fuel cell system.

10. The circuit of claim 9 wherein the components are integrated in edge areas of the composite fuel cell system.

11. The circuit of claim 9 wherein the components are integrated in the composite fuel cell system and distributed over a cross-sectional area of the composite fuel cell system.

12. The circuit of claim 11, further comprising a cooling system integrated with the composite fuel cell system.

13. A protective circuit for a composite fuel cell system having a plurality of serially connected individual fuel cells whose voltage is monitored, said protective circuit comprising:

a plurality of components connected in parallel with respective individual fuel cells of the fuel cell system;

wherein said components are connected externally to the composite fuel cell system and adapted to bridge particular individual fuel cells via a low resistance connected in parallel therewith in response to a voltage across said particular individual fuel cells.

14. The circuit of claim 13 wherein the components are diodes.

15. The circuit of claim 14 wherein the components are controllable switches.

16. The circuit of claim 15 wherein the controllable switches are MOS field-effect transistors.

17. A protective circuit for a composite fuel cell system having a plurality of serially connected individual fuel cells whose voltage is monitored, said protective circuit comprising:

a plurality of components connected in parallel with respective individual fuel cells of the fuel cell system;

wherein said components are adapted to bridge particular individual fuel cells via a low resistance connected in parallel therewith in response to a voltage across said particular individual fuel cells;

and wherein the components are integrated in the composite fuel cell system and distributed over a cross-sectional area of the composite fuel cell system.

18. The circuit of claim 17 wherein the components are diodes.

19. The circuit of claim 18 wherein the components are controllable switches.

20. The circuit of claim 19 wherein the controllable switches are MOS field-effect transistors.

21. A protective circuit for a composite fuel cell system having a plurality of serially connected individual fuel cells whose voltage is monitored, said protective circuit comprising:

a plurality of components connected in parallel with respective individual fuel cells of the fuel cell system;

wherein said components are controllable switches adapted to bridge particular individual fuel cells via a low resistance connected in parallel therewith in response to a voltage across said particular individual fuel cells;

and wherein the controllable switch is driven by an amplifier or comparator, whose output is connected to a control terminal of the controllable switch;

an input of the controllable switch is connected to one terminal of the individual fuel cell;

the amplifier or comparator is supplied with energy via a connection to terminals of a battery arrangement and current sources or current sinks;

a first potential shifting element is connected in parallel with the terminals for supplying energy;

a voltage dividing element is connected in parallel with the potential shifting element; and a tap of the voltage dividing element is connected to the other terminal of the individual fuel cell.

22. The circuit of claim 21 wherein for fuel cells arranged at extremities of the composite fuel cell system, respective potential shifting circuits are arranged between one terminal of the individual fuel cell and the input of the amplifier or comparator and also between the tap of the voltage dividing element and the other terminal of the individual fuel cell.

23. The circuit of claim 21 wherein a second potential shifting circuit is provided between the output of the comparator or amplifier and the control terminal of the controllable switch.

24. A protective circuit for a composite fuel cell system having a plurality of serially connected individual fuel cells whose voltage is monitored, said protective circuit comprising:

a plurality of components connected in parallel with respective individual fuel cells of the fuel cell system;

wherein said components are controllable diode switches adapted to bridge particular individual fuel cells via a low resistance connected in parallel therewith in response to a voltage across said particular individual fuel cells;

and wherein voltages of individual fuel cells are evaluated by means of an amplifier or comparator whose output is connected to at least one optocoupler that is controlled via the optocoupler.

25. A protective circuit for a composite fuel cell system having a plurality of serially connected individual whose voltage is monitored, said protective circuit comprising:

a plurality of components connected in parallel with respective individual fuel cells of the fuel cell system;

wherein said components are adapted to bridge particular individual fuel cells via a low resistance connected in parallel therewith in response to a voltage across said particular individual fuel cells;

and wherein the circuit arrangement is formed by at least one integrated circuit.

* * * * *

UNITED STATES PATENT AND TRADEMARK OFFICE
CERTIFICATE OF CORRECTION

PATENT NO. : 6,677,066 B1  
DATED : January 13, 2004  
INVENTOR(S) : Axel Jansen et al.

It is certified that error appears in the above-identified patent and that said Letters Patent is hereby corrected as shown below:

Column 12,
Line 40, "individual whose" should read -- individual fuel cells whose --.

Signed and Sealed this

Twenty-third Day of May, 2006

JON W. DUDAS
*Director of the United States Patent and Trademark Office*